United States Patent
Bajic et al.

(10) Patent No.: US 8,281,134 B2
(45) Date of Patent: Oct. 2, 2012

(54) METHODS AND APPARATUS FOR LAYER 2 AND LAYER 3 SECURITY BETWEEN WIRELESS TERMINATION POINTS

(75) Inventors: Zeljko Bajic, San Jose, CA (US); Ram Nagarajan, Sunnyvale, CA (US); Rajesh Vijayakumar, San Jose, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 881 days.

(21) Appl. No.: 12/361,624

(22) Filed: Jan. 29, 2009

(65) Prior Publication Data

US 2010/0191971 A1 Jul. 29, 2010

(51) Int. Cl.
*H04L 9/32* (2006.01)

(52) U.S. Cl. .......... 713/171; 713/153; 713/189; 380/28; 380/44; 380/270

(58) Field of Classification Search .................... 713/171
See application file for complete search history.

(56) References Cited

U.S. PATENT DOCUMENTS

| | | | | |
|---|---|---|---|---|
| 5,907,544 | A * | 5/1999 | Rypinski | 370/337 |
| 7,302,256 | B1 * | 11/2007 | O'Hara et al. | 455/418 |
| 7,508,801 | B1 * | 3/2009 | Calhoun et al. | 370/338 |
| 7,773,754 | B2 * | 8/2010 | Buer et al. | 380/277 |
| 2003/0210787 | A1 * | 11/2003 | Billhartz et al. | 380/270 |
| 2004/0005061 | A1 * | 1/2004 | Buer et al. | 380/282 |
| 2007/0204158 | A1 * | 8/2007 | Hatashita et al. | 713/171 |
| 2008/0187137 | A1 * | 8/2008 | Nikander et al. | 380/270 |
| 2009/0185677 | A1 * | 7/2009 | Bugbee | 380/28 |
| 2009/0298508 | A1 * | 12/2009 | Raju et al. | 455/450 |
| 2010/0138661 | A1 * | 6/2010 | Tsai et al. | 713/171 |
| 2010/0161817 | A1 * | 6/2010 | Xiao et al. | 709/229 |
| 2010/0199085 | A1 * | 8/2010 | Bansal | 713/153 |

OTHER PUBLICATIONS

Security Review of the Light-Weight Access Point Protocol draft-ohara-capwap-lwapp-02, T. Charles Clancy, May 12, 2005.*
Light Weight Access Point Protocol (LWAPP) draft-ohara-capwap-lwapp-01.txt, P. Calhoun et al., Feb. 2005.*
NPL: "Security Review of the Light-Weight Access Point Protocol", T, Charles Clancy, May 12, 2005.*

* cited by examiner

*Primary Examiner* — Kambiz Zand
*Assistant Examiner* — Yonas Bayou

(57) ABSTRACT

A method is provided for both layer 2 (L2) and layer 3 (L3) security in the context, for example, of a WISP-e protocol. An AES algorithm in CBC mode is used for encryption and decryption of the control frames. The session keys (e.g., 128-bit session keys) are derived from a pre-shared secret configured on both communicating wireless termination points.

19 Claims, 2 Drawing Sheets

METHODS AND APPARATUS FOR LAYER 2 AND LAYER 3 SECURITY BETWEEN WIRELESS TERMINATION POINTS

TECHNICAL FIELD

The present invention relates generally to wireless local area networks (WLANs) and, more particularly, to the securing of communications between access points, access ports, wireless switches and other components within a WLAN.

BACKGROUND

In recent years, there has been a dramatic increase in demand for mobile connectivity solutions utilizing various wireless components and wireless local area networks (WLANs). This generally involves the use of wireless access points (APs) that communicate with mobile devices using one or more RF channels.

In one class of wireless networking systems, relatively unintelligent access ports act as RF conduits for information that is passed to the network through a centralized intelligent switch, or "wireless switch," that controls wireless network functions. In a typical WLAN setting, one or more wireless switches communicate via conventional networks with multiple access points that provide wireless links to mobile units operated by end users. The wireless switch, then, typically acts as a logical "central point" for most wireless functionality. Consolidation of WLAN intelligence and functionality within a wireless switch provides many benefits, including centralized administration and simplified configuration of switches and access points.

Currently known systems, however, are undesirable in a number of respects. For example, security between different wireless termination points (e.g., wireless switches, access points, access ports, etc.) is still unsatisfactory and unstandardized, depending highly upon the types of termination points involved. Further, control frames tend to be sent in the clear over both level 2 and layer 3 networks.

One of the efforts to solve the security issue between such termination points is entitled Control and Provisioning of Wireless Access Points (CAPWAP) Protocol Specification, Calhoun, ed., et al., Internet Draft, March 2008. In this protocol, however, the embedded implementation based on DTLS is exceedingly large, taking up a large amount of memory in the housing device. Furthermore, there are interoperability problems between devices introduced by the methods set forth in CAPWAP.

Accordingly, it is desirable to provide improved, lightweight methods and systems for securing control frames on both levels 2 and 3 for wireless termination points. Other desirable features and characteristics will become apparent from the subsequent detailed description and the appended claims, taken in conjunction with the accompanying drawings and the foregoing technical field and background.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

The present invention relates to a method of layer 2 (L2) and layer 3 (L3) security between wireless endpoints in a WLAN. In this regard, the following detailed description is merely illustrative in nature and is not intended to limit the invention or the application and uses of the invention. Furthermore, there is no intention to be bound by any express or implied theory presented in the preceding technical field, background, brief summary or the following detailed description.

Various aspects of the exemplary embodiments may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., radio-frequency (RF) devices, memory elements, digital signal processing elements, logic elements and/or the like, which may carry out a variety of functions under the control of one or more microprocessors or other control devices. In addition, the present invention may be practiced in conjunction with any number of data transmission protocols and that the system described herein is merely one exemplary application for the invention.

For the sake of brevity, conventional techniques related to signal processing, data transmission, signaling, network control, the IEEE 802.11 family of specifications, and other functional aspects of the system (and the individual operating components of the system) may not be described in detail herein. Furthermore, the connecting lines shown in the various figures contained herein are intended to represent example functional relationships and/or physical couplings between the various elements. It should be noted that many alternative or additional functional relationships or physical connections may be present in a practical embodiment.

Without loss of generality, in the illustrated embodiment, many of the functions usually provided by a traditional wireless access point (e.g., network management, wireless configuration, and the like) can be concentrated in a corresponding wireless switch. It will be appreciated that the present invention is not so limited, and that the methods and systems described herein may be used in the context of other network environments, including any architecture that makes use of client-server principles or structures.

Figure 1:
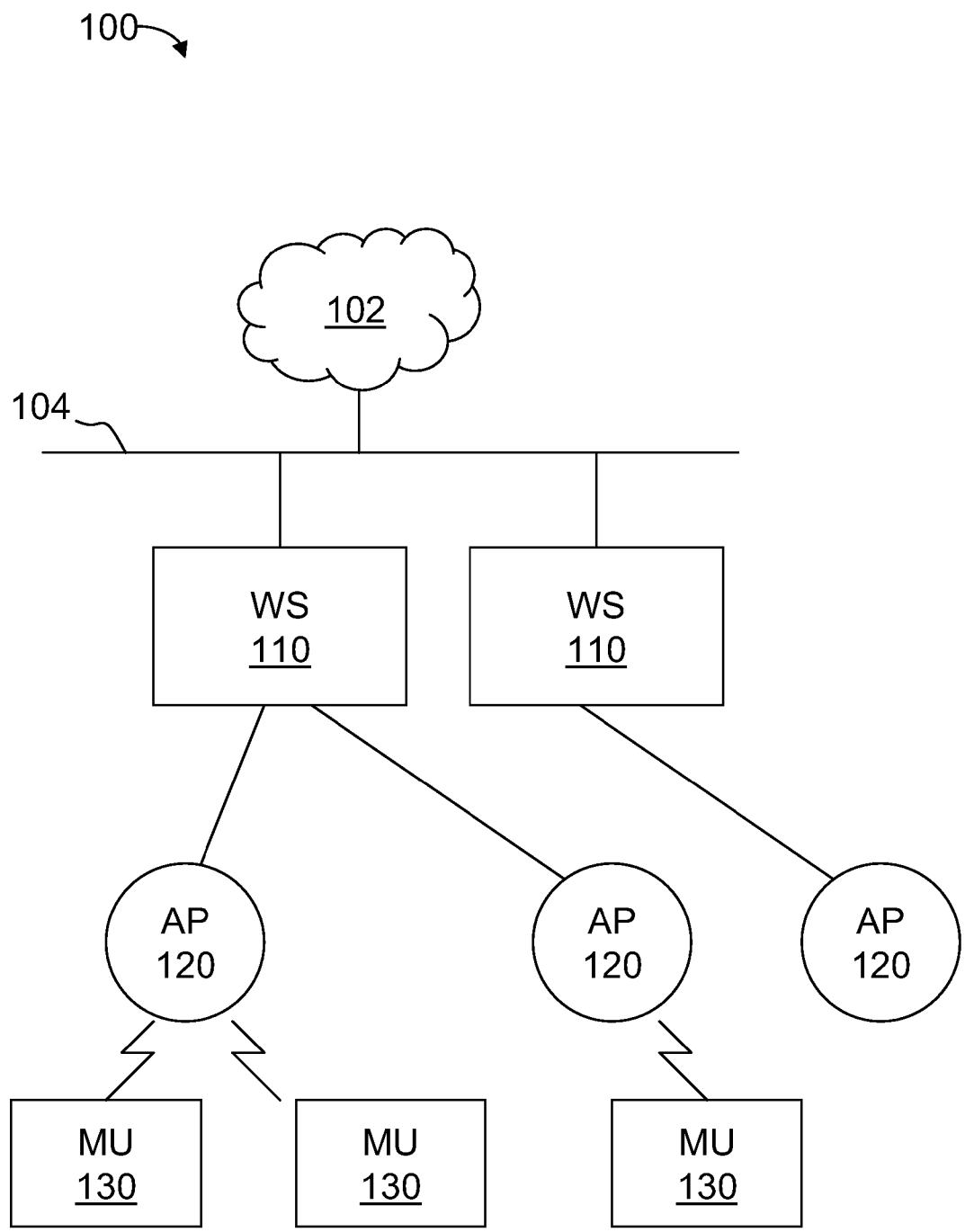
FIG. 1 is a conceptual overview of an exemplary wireless network according to one embodiment.

Referring now to the exemplary, simplified WLAN architecture 100 shown in FIG. 1, one or more switching devices 110 (alternatively referred to as "wireless switches," "WS," or simply "switches") are coupled via one or more networks 104 (e.g., an Ethernet or other local area network coupled to one or more other networks or devices, indicated by network cloud 102). One or more wireless access ports 120 (alternatively referred to as "access ports" or "APs") are configured to wirelessly connect switches 110 to one or more mobile units 130 (or "MUs") after a suitable AP adoption process. APs 120 are suitably connected to corresponding switches 110 via communication lines 106 (e.g., conventional Ethernet lines).

Any number of additional and/or intervening switches, routers, servers and other networks or components may also be present in the system. Similarly, APs 120 may have a single or multiple built-in radio components. Various wireless switches and access ports are available from SYMBOL TECHNOLOGIES of San Jose, Calif., although the concepts described herein may be implemented with products and services provided by any other supplier.

A particular AP 120 may have a number of associated MUs 130. For example, in the illustrated topology, two MUs 130 are logically associated with one AP, while a single MU is associated with another. Again, the logical connections shown in the figures are merely exemplary, and other embodiments may include widely varying components arranged in any topology.

Following an adoption process, each WS 110 determines the destination of packets it receives over network 104 and routes that packet to the appropriate AP 120 if the destination is an MU 130 with which the AP is associated. Each WS 110 therefore maintains a routing list of MUs 130 and their associated APs 130. These lists are generated using a suitable packet handling process as is known in the art. Thus, each AP 120 acts primarily as a conduit, sending/receiving RF transmissions via MUs 130, and sending/receiving packets via a network protocol with WS 110. Equivalent embodiments may provide additional or different functions as appropriate.

The particular aspects and features described herein may be implemented in any manner. In various embodiments, the processes described above are implemented in software that executes within one or more of the components shown in FIG. 1. This software may be in source or object code form, and may reside in any medium or media, including random access, read only, flash or other memory, as well as any magnetic, optical or other storage media. In other embodiments, the features described herein may be implemented in hardware, firmware and/or any other suitable logic.

The present invention generally relates to a method for providing both layer 2 (L2) and layer 3 (L3) security for control frames (e.g., of a Control and Provisioning of Wireless Access Points (CAPWAP) protocol) in the context, for example, of the WISP-e protocol. The method of providing security in CAPWAP is called DTLS (Datagram TLS). An AES algorithm in CBC mode is used for encryption and decryption of the control frames. The session keys (e.g., 128-bit session keys) are derived from a pre-shared secret configured on both communicating wireless termination points. In this regard, the term "wireless termination point" or simply "termination point" refers to any networked component so configured, including, for example, APs 120, WSs 102, and the like. Furthermore, while the present invention is described in the context of an 802.11 implementation, the invention is not so limited. It will be appreciated that, while 128-bit encryption is used as an example herein, the use of 192-bit and 256-bit key sizes may also be used for added security.

Initially, a secret is pre-shared between termination points. This pre-shared secret is used for derivation of the session keys. In this way, X.509 Certificate Based authentication need not be provided. The AES algorithm in CBC mode will be used for encryption and decryption of the WISP-e control frames with, for example, a key size of 128 bits.

In the discussion that follows, the example of a wireless switch 110 communicating with an AP 120 is described; however, this example is presented without loss of generality, as any two wireless termination points may be used.

On the wireless switch 110 side, the pre-shared secret may be configured using the command line interface. The shared secret is then used for deriving the keys for all APs 120. The session key will be generated for each session of an AP 120 upon being adopted, and this session key will be different for each AP. The shared secret may be configured using a command line interface, SNMP, an applet, or the like for each AP 120 or list of APs 120, and may be sent in the clear to AP(s) in a pre-staging state. A default shared secret is preferably provided for each component, as well as command line interface commands for modification and display In one embodiment, the pre-shared secret is defined as a string 8 to 64 characters long, and is used for deriving session keys using a well-known SHA-1 function. SHA-1 produces a 160-bit output called a "message digest." Only 128 bit of the output need be used for the session key.

The session key is derived as:

$$K_S = SHA1-128(S\|N1\|N2)$$

wherein the shared secret is designated as S, the session key is denoted as $K_S$, nonce 1 (a set of random numbers generated by the AP) is designated as N1, and nonce 2 (a set of random numbers generated by the switch) is designated as N2. SHA1-128 is the first 128 bits of the SHA-1 of its argument list. Note that the session key is unique for the session despite the fact that it is generated from the same shared secret. In an alternate embodiment, SHA-256 or HMAC-SHA-1 may be used.

Figure 2:
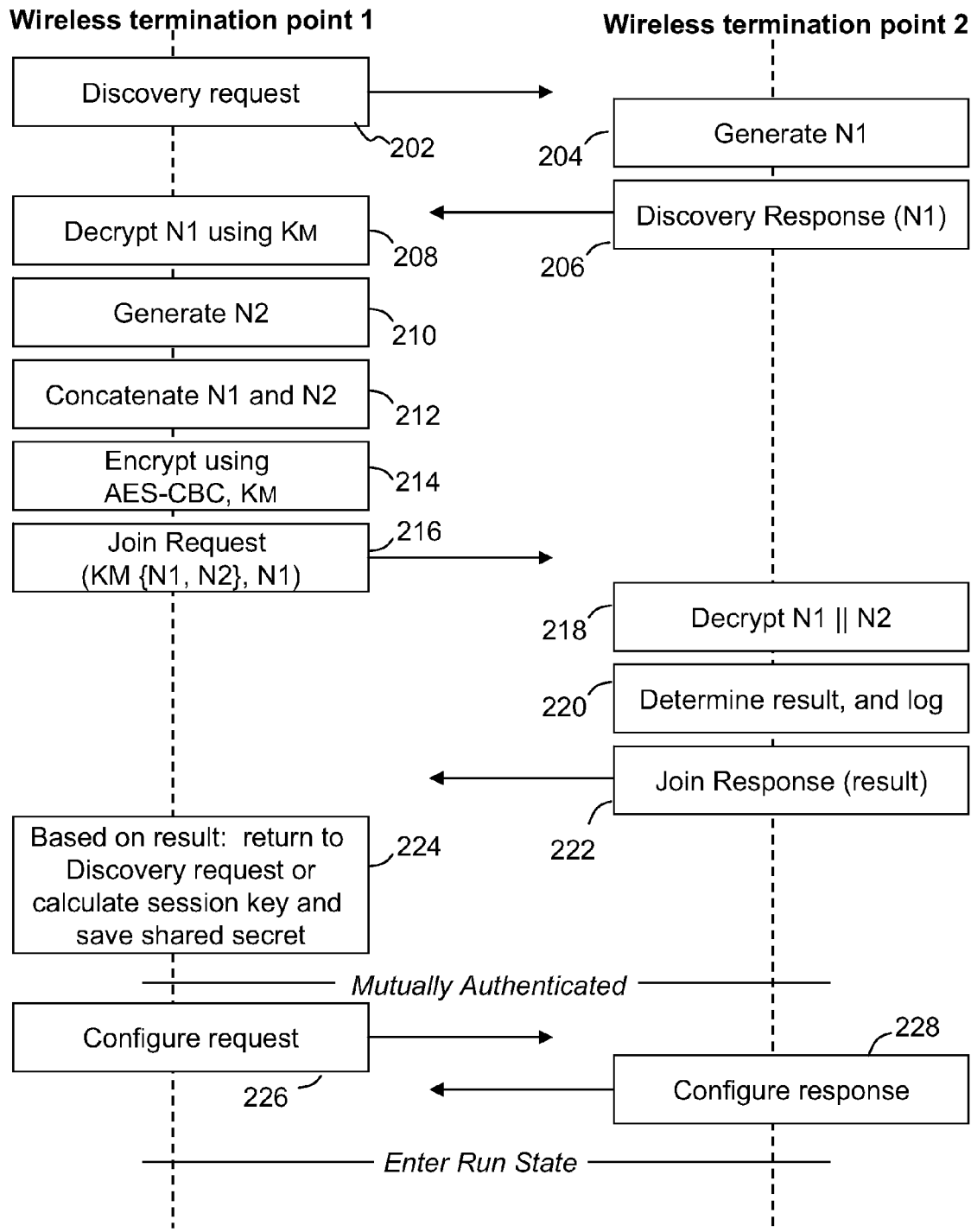
FIG. 2 is a flowchart depicting a method in accordance with one embodiment of the present invention.

FIG. 2 depicts a method in accordance with one embodiment of the present invention wherein one termination point (e.g., an access point) communicates with another termination point (e.g., a wireless switch). For the sake of simplicity, these two entities will be referred to as an AP and WS respectively, although of course the invention is not so limited.

As shown, the process starts with a discovery request from AP 120 to WS 110 (step 202). In response, WS 110 generates the first nonce, N1 (step 204), and provides a discovery response 206 (i.e., N1).

Next, AP 120 decrypts N1 using the master key (step 208), then generates a second nonce N2 (step 210). N1 and N2 are then concatenated (step 212) and encrypted (step 214). In the illustrated embodiment, an AES-CBC algorithm applied to the master key is used for encryption, and the result is used for a join request to WS 110 (step 216).

WS 110 then decrypts the concatenated nonces (step 218), determines the result (step 220), and logs the result. More particularly, if the decrypted nonce value N1 is equal to its original value (which was previously generated in step 204), it is concluded that AP 120 knows the shared secret, and the result is successful authentication. If not, then the result is that authentication fails.

In step 222, the result is sent to WS 110 as a join response (i.e., responding to the join request generated in step 216). If pre-staging is enabled for the AP, then the WS may send the pre-shared secret to the AP in the clear. Based on the result received at WS 110, the system either returns to the discovery request step 202 (i.e., if authentication fails), or calculates a session key and saves the shared secret (step 224).

At this point in the process, as illustrated, the two termination points have been mutually authenticated. As a result, WS 110 may then send a configured request 226, which is followed by a configure response 228 as appropriate. From this point, the system enters a "run" state and proceeds accordingly.

It will be appreciated that the illustrated embodiment solves rogue AP and rogue switch problem as both termination points are required to prove that they know the shared secret.

The default pre-shared secret is used as a pre-shared secret between the WS 110 and one or more APs 120 only if it has not been over-written by the operator. In a preferred embodiment, the operator changes this default value for each AP 120 or a list of APs 120. To pass the shared secret to an AP 120, an operator sets this AP in the pre-staging state by using an appropriate user interface. Otherwise the AP 120 will be rejected during discovery/join handshake if it does not have same shared secret. The payload message element is used by the wireless switch to communicate its current state. With respect to the Security field, an 8-bit mask is used specifying the authentication credential type supported by the wireless switch (e.g., X.509 certificate based or pre-shared secret-based).

With respect to pre-staging, the pre staging process is preferably performed in a trusted environment. Thus the AP is configured with a pre-shared secret. An operator may decide to pre-stage APs, directly connecting these APs to a switch, or may not pre-stage, deciding instead to turn staging on during deployment. Alternatively, the operator may decide to pre-stage APs over an L3 network, and wants to be sure that the network is trusted, which is a difficult task. The operator is responsible for performing staging process in a trusted, secured environment because the staging process is vulnerable, and the secret is sent in the clear—i.e., unencrypted.

If pre staging is enabled, a proprietary information element containing the pre-shared secret will be added in the payload of the Join Response message 222 in the clear (not encrypted).

Once the pre-staging is done in a trusted environment, it may be turned off. Any further changes of the pre-shared secret from the wireless switch user interface (CLI, GUI, SNMP) will be sent as an information element in the Configuration Update message encrypted and secured (i.e., a CAPWAP message).

Pre-staging therefore solves a problem of configuring devices if they do not have an easily accessible user interface (e.g., a command line interface CLI). In accordance with the present invention the device can be initially configured in the pre-staging area with a critical configuration (such as a shared secret) and other critical security parameters (CSPs) if needed. Once the device is pre-staged, the pre-staging option can be turned off on the wireless switch side and the access point (or port) can be deployed and used in a secure environment with the disclosed security protocol. Pre-staging can be performed in the real deployment if the security of the network can be guaranteed during the pre-staging procedure.

Pre-staging is preferably enabled from the wireless switch during short period needed to pre-stage APs and than it should be disabled from the wireless switch (CLI or GUI). Pre-staging is preferably not left "on" during normal operation since the shared secret will be exposed in the Join Response message in the clear.

In one embodiment implementing a WISP-e protocol, the L3 WISP-e control packet is formatted as follows:

```
CAPWAP Control Packet (WISP-e Version):
+-------------------------------------------------+
| IP  |UDP | CAPWAP | Control | Message           |
| Hdr |Hdr | Header | Header  | Element(s)        |
+-------------------------------------------------+
```

Similarly, the L2 WISP-e packet formats are as follows:

```
CAPWAP Data Packet (L2 Version):
+------------------------------------------------------------+
|   Ethernet Hdr |WISP Cmd| CAPWAP Port |CAPWAP  | Wireless  |
| Src|Dst|0x8783 |(0x0080)|    (TBD)    | Header | Payload   |
+------------------------------------------------------------+

CAPWAP Control Packet (L2 Version):
+------------------------------------------------------------+
|   Ethernet Hdr |WISP Cmd | CAPWAP Port|CAPWAP  |Control| Msg     |
| Src|Dst|0x8783 |(0x0080) |   (12222)  |Header  |Header | Elem(s) |
+------------------------------------------------------------+
```

The protocol messages (e.g., CAPWAP messages) are preferably encapsulated using a common header format, regardless of the CAPWAP control or CAPWAP Data transport used to carry the messages. For example, a message may be encapsulated as follows:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|Version|   RID   |  HLEN  |F|L|W|M|            Flags           |
+-+-+-+-+-+-+-+-+-+-+-+-+-+-+-+-+-+-+-+-+-+-+-+-+-+-+-+-+-+-+-+-+
|         Fragment ID         |        Frag Offset    |Rsv-2|
+-+-+-+-+-+-+-+-+-+-+-+-+-+-+-+-+-+-+-+-+-+-+-+-+-+-+-+-+-+-+-+-+
|                   (optional) Radio MAC Address                |
+-+-+-+-+-+-+-+-+-+-+-+-+-+-+-+-+-+-+-+-+-+-+-+-+-+-+-+-+-+-+-+-+
|              (optional) Wireless Specific Information         |
+-+-+-+-+-+-+-+-+-+-+-+-+-+-+-+-+-+-+-+-+-+-+-+-+-+-+-+-+-+-+-+-+
|                          Payload ....                         |
+-+-+-+-+-+-+-+-+-+-+-+-+-+-+-+-+-+-+-+-+-+-+-+-+-+-+-+-+-+-+-+-+
```

Note that WISP-e defines bit 17 in the first long word as the "C" bit. For WISP-e, this bit is used to indicate that the message is a Control message. If it is not set, the message is considered a Wireless Payload (a data frame). Furthermore, WISP-e defines bit 18 in the first long word as the "S" (secure) bit. In WISP-e, this bit is used to indicate that the message is a Control message and that it is encrypted. The S bit will be set if the C bit is set and encryption is required.

The CAPWAP control messages are sent encapsulated within the CAPWAP header as shown above, and immediately following the CAPWAP header is the control header, which has the following format:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                          Message Type                         |
+-+-+-+-+-+-+-+-+-+-+-+-+-+-+-+-+-+-+-+-+-+-+-+-+-+-+-+-+-+-+-+-+
|   Seq Num    |     Msg Element Length    |       Flags        |
+-+-+-+-+-+-+-+-+-+-+-+-+-+-+-+-+-+-+-+-+-+-+-+-+-+-+-+-+-+-+-+-+
|                           Time Stamp                          |
+-+-+-+-+-+-+-+-+-+-+-+-+-+-+-+-+-+-+-+-+-+-+-+-+-+-+-+-+-+-+-+-+
| Msg Element [0..N] ...
+-+-+-+-+-+-+-+-+-+-+-+-+
```

The valid values for base CAPWAP Message Types are given in the tables below. In WISP-e, the following messages are sent in the clear:

| CAPWAP Control Message | Message Type Value |
|---|---|
| Discovery Request | 1 |
| Discovery Response | 2 |
| Join Request | 3 |
| Join Response | 4 |

The following messages, however, are encrypted if encryption is required:

| CAPWAP Control Message | Message Type Value |
|---|---|
| Configuration Status | 5 |
| Configuration Status Response | 6 |
| Configuration Update Request | 7 |
| Configuration Update Response | 8 |
| WTP Event Request | 9 |
| WTP Event Response | 10 |
| Change State Event Request | 11 |
| Change State Event Response | 12 |

-continued

| CAPWAP Control Message | Message Type Value |
|---|---|
| Echo Request | 13 |
| Echo Response | 14 |
| Image Data Request | 15 |
| Image Data Response | 16 |
| Reset Request | 17 |
| Reset Response | 18 |
| Primary Discovery Request | 19 |
| Primary Discovery Response | 20 |
| Data Transfer Request | 21 |
| Data Transfer Response | 22 |
| Clear Config Indication | 23 |
| Mobile Config Request | 24 |
| Mobile Config Response | 25 |
| Symbol WTP Log Request | 1024 |
| Symbol WTP Log Response | 1025 |

The encrypted part starts from the message type (including the CAPWAP protocol header), and the length of the encrypted data is calculated from the UDP or IP header as:

Encrypted_length=UDP_length−CAPWAP_common_header_length.

In case of L2 WISP-e, the length is suitably derived from the WISP-e header The last two control messages are WISP-e specific and may be added to suit an organization's particular needs. The IDs are preferably chosen such that they do not conflict with the possible extension on CAPWAP's own ids. Any newly-defined CAPWAP control message is also preferably secured.

It should be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention as set forth in the appended claims and the legal equivalents thereof.

What is claimed is:

1. A method for providing security for control frames communicated between a first termination point and a second termination point in a wireless local area network, the method comprising:
   providing a shared secret to the first termination point and the second termination point;
   sending a discovery request to the second termination point;
   generating, at the second termination point, a first nonce, encrypting the first nonce using a master key derived from the shared secret, and transmitting the encrypted first nonce to the first termination point in a discovery response;
   decrypting the encrypted first nonce in the first termination point using the same master key derived from the shared secret;
   generating a second nonce at the first termination point;
   concatenating the first and second nonces and encrypting the result using an encryption algorithm and the master key to form an encrypted join request;
   sending the encrypted join request to the second termination point;
   decrypting the encrypted join request to determine a decrypted first nonce;
   if the first nonce is equal to the decrypted first nonce, sending a join response indicative of authentication;
   calculating a session key from at least one nonce; and
   entering a run state and sending the control frames in accordance with the session key.

2. The method of claim 1, wherein the session key in the calculating step is derived from the shared secret and the first and second nonces such that the session key is unique for the session despite being generated from the same shared secret.

3. The method of claim 1, wherein if authentication is received and if pre-staging is enabled for the first termination point, further including sending the shared secret without encryption in the join response to the first termination point from the second termination point, wherein sending the shared secret completes mutual authentication of the two termination points by proving that the two termination points both known the shared secret.

4. The method of claim 3, wherein pre-staging is performed in a trusted environment.

5. The method of claim 4, wherein if pre-staging is not enabled the shared secret is provided secured and encrypted in a configuration update message.

6. The method of claim 1, further including providing a configuration request from the first termination point to the second termination point subsequent to the calculating step.

7. The method of claim 1, wherein the discovery request, discovery response, join request, and join response are themselves not encrypted.

8. The method of claim 1, wherein the shared secret is configured using a command line interface.

9. The method of claim 1, wherein the control frames are encapsulated using a common header format.

10. A wireless local area network system comprising:
    a first termination point communicatively coupled with a second termination point over a wireless local area network, each of the first and second termination points having a shared secret;
    wherein the second termination point is configured to receive a discovery request from the first termination point, generate a first nonce, encrypt the first nonce using a master key derived from the shared secret, and transmit the encrypted first nonce to the first termination point in a discovery response;
    wherein the first termination point is configured to decrypt the encrypted first nonce using the same master key derived from the shared secret, generate a second nonce, concatenate the first and second nonces, encrypt the concatenated first and second nonces using the master key to form an encrypted join request, and send the encrypted join request to the second termination point;
    wherein the second termination point is configured to decrypt the encrypted join request to determine a decrypted first nonce and, if the first nonce is equal to the decrypted first nonce, send a join response to the first termination point indicative of authentication, and calculate a session key from at least one nonce; and
    wherein both the first and second termination points are configured to enter a run state and intercommunicate control frames in accordance with the session key.

11. The system of claim 10, wherein the session key is derived from the shared secret and the first and second nonces such that the session key is unique for the session despite being generated from the same shared secret.

12. The system of claim 10, wherein if authentication is received and if pre-staging is enabled for the first termination point, the second termination point sends the shared secret without encryption in the join response to the first termination point, wherein sending the shared secret completes mutual authentication of the two termination points by proving that the two termination points both known the shared secret.

13. The system of claim 12, wherein pre-staging is performed in a trusted environment.

14. The system of claim 13, wherein if pre-staging is not enabled the shared secret is provided secured and encrypted in a configuration update message.

15. The system of claim 10, wherein the first termination point is configured to send a configuration request to the second termination point.

16. The system of claim 10, wherein the discovery request, discovery response, join request, and join response are themselves not encrypted.

17. The system of claim 10, wherein the shared secret is configured using a command line interface.

18. The system of claim 10, wherein the control frames are encapsulated using a common header format.

19. An access point configured to securely communicate control frames over a wireless local area network, the access point comprising:
- a memory for storing a shared secret and a set of machine-readable instructions;
- a processor configured to execute the set of machine-readable instructions to cause the access point to send a discovery request, receive first nonce encrypted using a master key derived from the shared secret, decrypt the encrypted first nonce using the same master key derived from the shared secret, generate a second nonce, concatenate the first and second nonces to form a concatenated result, encrypt the concatenated result using an encryption algorithm and the master key to form an encrypted join request, send the encrypted join request over the wireless local area network, receive a join response indicative of authentication if the first nonce is equal to the decrypted first nonce;
- calculate a session key from at least one nonce; and transmit the control frames in accordance with the session key.

* * * * *

UNITED STATES PATENT AND TRADEMARK OFFICE
CERTIFICATE OF CORRECTION

PATENT NO. : 8,281,134 B2  
APPLICATION NO. : 12/361624  
DATED : October 2, 2012  
INVENTOR(S) : Bajic et al.

Page 1 of 1

It is certified that error appears in the above-identified patent and that said Letters Patent is hereby corrected as shown below:

In Column 3, Line 31, delete "APs 130." and insert -- APs 120. --, therefor.

In Column 4, Line 29, delete "display" and insert -- display. --, therefor.

In Column 11, Line 8, in Claim 19, delete "receive" and insert -- receive a --, therefor.

Signed and Sealed this  
Twelfth Day of February, 2013

Teresa Stanek Rea  
*Acting Director of the United States Patent and Trademark Office*